(12) United States Patent
Gohil et al.

(10) Patent No.: US 10,394,670 B2
(45) Date of Patent: Aug. 27, 2019

(54) HIGH AVAILABILITY AND DISASTER RECOVERY SYSTEM ARCHITECTURE

(71) Applicant: Verizon Patent and Licensing Inc., Basking Ridge, NJ (US)

(72) Inventors: Harshad Gohil, Franklin Park, NJ (US); Jeffrey James Bath, Newton, NJ (US); Shyam Kumar Desu, Edison, NJ (US); Jeetendra Pradhan, Budd Lake, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 162 days.

(21) Appl. No.: 15/612,599

(22) Filed: Jun. 2, 2017

(65) Prior Publication Data

US 2018/0349239 A1 Dec. 6, 2018

(51) Int. Cl.
| | | |
|---|---|---|
| *G06F 11/00* | (2006.01) | |
| *G06F 11/20* | (2006.01) | |
| *G06F 16/27* | (2019.01) | |
| *G06F 11/14* | (2006.01) | |

(52) U.S. Cl.
CPC ........ *G06F 11/203* (2013.01); *G06F 11/1448* (2013.01); *G06F 11/1464* (2013.01); *G06F 11/2023* (2013.01); *G06F 11/2025* (2013.01); *G06F 11/2048* (2013.01); *G06F 16/27* (2019.01); *G06F 2201/80* (2013.01); *G06F 2201/805* (2013.01); *G06F 2201/82* (2013.01)

(58) Field of Classification Search
CPC ............ G06F 11/2025; G06F 11/2048; G06F 11/2033; G06F 11/1448; G06F 11/1464; G06F 11/2023; G06F 11/2056
See application file for complete search history.

(56) References Cited

U.S. PATENT DOCUMENTS

| | | | |
|---|---|---|---|
| 2009/0100289 A1* | 4/2009 | Chen ...................... | G06F 11/203 714/4.11 |
| 2011/0145836 A1* | 6/2011 | Wheeler ................. | G06F 9/546 719/314 |
| 2011/0202572 A1* | 8/2011 | Ho ......................... | G16H 10/60 707/802 |
| 2013/0326261 A1* | 12/2013 | Paulson .............. | G06F 11/2028 714/4.11 |
| 2018/0302266 A1* | 10/2018 | Makovsky ............ | H04L 41/046 |

* cited by examiner

*Primary Examiner* — Charles Ehne

(57) ABSTRACT

A system may include a first device to provide a uniform resource identifier (URI) resolution or routing service among a first data center and a second data center. The first device may provide a first failover service among devices associated with the first data center for a set of interfaces. The system may include a first set of devices and a second set of devices associated with a first application and a second application. The first device may provide a second failover service for the first and second sets of devices. The system may include a first database cluster to provide software or a service related to clustering another set of devices or providing a threshold level of availability for the other set of devices. The first database cluster may provide a failover service for the other set of devices.

20 Claims, 5 Drawing Sheets

US 10,394,670 B2

HIGH AVAILABILITY AND DISASTER RECOVERY SYSTEM ARCHITECTURE

BACKGROUND

Disaster recovery (DR) may include a set of policies and/or procedures to enable the recovery and/or continuation of technology infrastructure and systems following a natural or human-induced disaster. DR may focus on the information technology (IT) and/or technology systems supporting organizational functions. High availability may refer to a characteristic of a system that is intended to ensure a threshold level of operational performance, such as uptime, for a threshold amount of time. Availability of a system may refer to an ability of a user community to obtain a service and/or a good from the system, to access the system (e.g., view and/or modify data stored by the system, use an application provided by the system, etc.), and/or the like.

DETAILED DESCRIPTION OF PREFERRED EMBODIMENTS

The following detailed description of example implementations refers to the accompanying drawings. The same reference numbers in different drawings may identify the same or similar elements.

A data center that is used to provide a service (e.g., an inventory management service, a point-of-sale (POS) service, a data storage service, etc.) to an end user may need to have a high availability (e.g., a threshold level of operational performance, such as uptime, for a threshold amount of time) and/or may need to be quickly recoverable in the event of a partial or complete outage at the data center, so as to reduce or eliminate interruptions to the service, loss of data, and/or the like. The data center may lack an architecture that provides high availability and disaster recovery for applications (e.g., Systems, Applications and Products (SAP) applications) within a data center and across multiple data centers.

Some implementations, described herein, provide a system (e.g., a data center, a network-based system, etc.) that is capable of providing a fail over service for applications, devices, etc., a data replication service, and/or the like for the system. In this way, the system may provide a threshold level of availability (e.g., a high availability) and may be capable of permitting disaster recovery of the system in the event of a partial or complete outage of a system. This improves operations of the system by improving an availability of the system and/or reducing an amount of downtime for the system in the event of a partial or complete outage. Further, this reduces data loss due to the system being overloaded and/or due to a partial or complete outage of the system, thereby improving performance of the system via reduced data loss and/or conserving processing resource of the system that would have to be used to recover lost data.

In addition, some implementations, described herein, reduce or eliminate a need for computing resources that mirror data associated with the system in real-time and/or reduce or eliminate a need for a redundant system, thereby conserving computing resources of the system that would otherwise be used to mirror data of the system in real-time and/or computing resources that would otherwise be needed to operate a redundant system. Further, some implementations, described herein, reduce an amount of downtime a system may experience during an outage of the systems, thereby improving operations of the system via faster recovery of the system.

Figure 1:
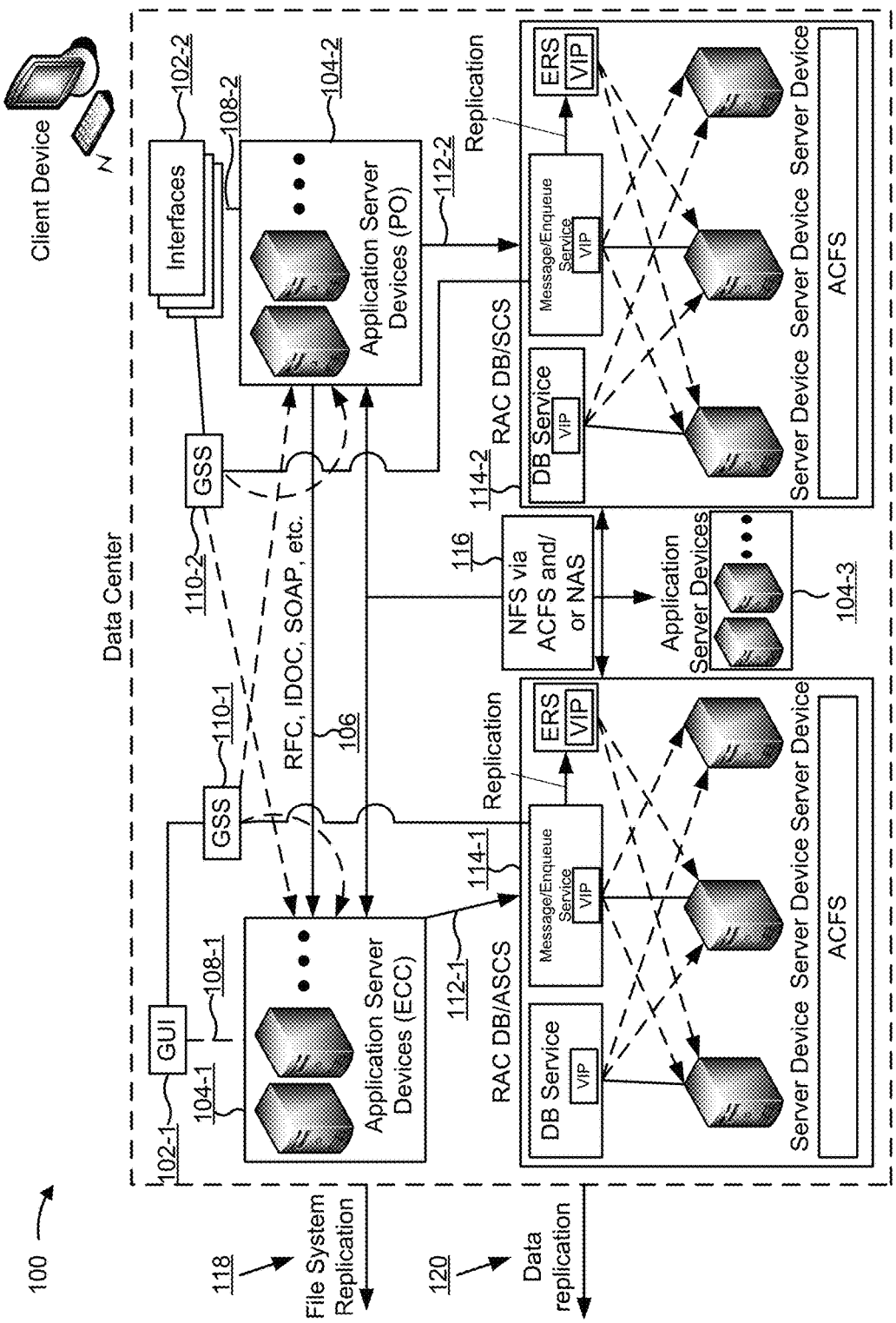
FIG. 1 is a diagram of an overview of an example implementation described herein.

FIG. 1 is a diagram of an overview of an example implementation 100 described herein. FIG. 1 shows an example data center architecture (e.g., a system) that permits both disaster recovery and high availability of the system. As shown in FIG. 1, implementation 100 may include a data center, various elements associated with the data center, such as a set of interfaces, a set of application server devices, and/or a set of database (DB) clusters, and a client device (e.g., associated with a user accessing a service, an application, and/or the like provided by the data center, a network administrator associated with the data center, etc.).

As shown in FIG. 1, and by reference numbers 102-1 and 102-2, the data center may include a set of interfaces that permit the client device to connect to and/or communicate with the data center, such as to access a service provided by the data center, to view and/or modify data stored in the data center, to access an application that the data center is hosting, and/or the like. For example, and as shown by reference number 102-1, the data center may include graphical user interfaces (GUIs), such as an SAP GUI and/or a NetWeaver business client (NWBC) interface. As another example, and as shown by reference number 102-2, the data center may include other types of interfaces, such as a web interface (e.g., for customer access), a mobile interface (e.g., for mobile access), and/or the like.

As shown by reference numbers 104-1 through 104-3, the data center may include a set of application server devices that provides resources to provide an application (e.g., a web application) and/or an environment to run an application. For example, and as shown by reference number 104-1, the data center may include a set of enterprise resource planning (ERP) central component (ECC) application server devices that performs an action to manage transactions (e.g., notification generation, data modification, transaction management, and/or the like).

As another example, and as shown by reference number 104-2, the data center may include a set of process orchestration (PO) application server devices that performs an action to integrate systems such as data formatting, transforming data from a first format to a second format, and/or the like for a system that is to receive the data (e.g., a third party system, an inventory management system, etc.). In some implementations, a set of PO application server devices may perform an action to permit interfacing between systems (e.g., legacy systems, POS systems, etc.), such as by using web services, proxy, Intermediate Document (IDoc), Java database connectivity (JDBC), a file adapter to read a message from a file and to submit the message to a server device, and/or the like. This permits a data center to be integrated with one or more systems. For example, an application associated with the data center may connect via a network to another application (e.g., associated with a legacy system) hosted by another data center. In some implementations, a set of PO application server devices may include a set of Java virtual machines (JVMs) that run a Java program to perform the functions described above.

As shown by reference number 104-3, and as another example, a set of application server devices associated with a data center may include various other types of application server devices. For example, a set of application server devices may include an application server device that hosts an SAP solution manager application, an application server device that is functioning as a non-production server device to be used for testing a system, an application, and/or the like, an application server device that hosts a business warehouse (BW) application, such as a BW reporting application, and/or the like.

In some implementations, within a set of application server devices, a particular application server device can fail over to another application server device within the set of application server devices. For example, within a set of ECC server devices (shown by reference number 104-1), a first ECC application server device may fail over to a second ECC application server device, such that the second ECC application server device may batch process unprocessed transactions from the first ECC server device (e.g., an unprocessed list of deliveries to be completed). This permits failure of an application server device without affecting availability of an application and/or a service provided by the application server device, thereby increasing an availability of the system.

In some implementations, use of a set of application server devices to provide an application may increase a scalability of an application. For example, an application may be scaled via use of additional processors (e.g., central processing units (CPUs), additional memory components, additional logical domains (LDOMs), additional virtual machines (VMs), use of scalable processor architecture (SPARC), and/or the like). This permits a data center to be quickly reconfigured to handle increased demand for an application hosted by the data center.

In some implementations, a first set of application server devices may be connected to another set of application server devices. For example, and as shown by reference number 106, a set of PO application server devices shown by reference number 104-2 may be connected to a set of ECC application server devices shown by reference number 104-1 (e.g., using a remote function call (RFC), simple object access protocol (SOAP), IDoc, etc.), such as to permit the set of PO application server devices shown by reference number 104-2 to provide data to the set of ECC application server devices shown by reference number 104-1.

As shown by reference numbers 108-1 and 108-2, the set of interfaces shown by reference numbers 102-1 and 102-2 may be connected to the set of application server devices shown by reference numbers 104-1 and 104-2, such as to permit a user of the client device to access a service provided by the set of application server devices. As shown by reference numbers 110-1 and 110-2, the set of interfaces shown by reference numbers 102-1 and 102-2 may be connected to a set of DB clusters, as described in more detail below. For example, the set of interfaces shown by reference numbers 102-1 and 102-2 may be connected to the set of DB clusters using a global site selector (GSS) device that provides uniform resource identifier (URI) (e.g., a domain name, a uniform resource locator (URL), or a uniform resource name (URN)) resolution and/or routing services among multiple redundant, geographically dispersed (e.g., physically separated), data centers, or elements of a data center (e.g., based on load, whether a data center, or an associated element, is experiencing a service interruption, etc.).

The GSS device may perform load balancing, provide a failover service, and/or the like among data centers and/or elements of a data center. The GSS devices shown by reference numbers 110-1 and 110-2 may load balance among the set of application server devices shown by reference numbers 104-1 and 104-2, provide a failover service from one of the set of application server devices shown by reference numbers 104-1 and 104-2 to another of the set of application server devices shown by reference numbers 104-1 and 104-2, and/or the like (e.g., as shown using the dotted lines associated with the GSS devices shown by reference numbers 110-1 and 110-2).

As shown by reference numbers 112-1 and 112-2, the set of application server devices shown by reference numbers 104-1 and 104-2 may be connected to a set of DB clusters shown by reference numbers 114-1 and 114-2. For example, the set of application server devices shown by reference numbers 104-1 and 104-2 may be connected to the set of DB clusters shown by reference numbers 114-1 and 114-2 to provide data to the set of DB clusters shown by reference numbers 114-1 and 114-2, to access data stored by the set of DB clusters shown by reference numbers 114-1 and 114-2, and/or the like.

As shown by reference numbers 114-1 and 114-2, the data center may include a set of DB clusters that provides software and/or services for clustering and high availability (e.g., a threshold level of availability of services provided by the data center during a threshold amount of time). For example, and as shown by reference number 114-1, the data center may include a real application cluster (RAC) database (DB)/advanced business application programming (ABAP) SAP central services (ASCS) (RAC DB/ASCS) cluster. The DB cluster shown by reference number 114-1 may include a set of server devices that provides various services. For example, as shown, the DB cluster shown by reference number 114-1 may include a first server device that provides a DB service (e.g., a data look up service, a data modification service, etc.), a second server device that provides a message and/or enqueue service (e.g., an ASCS server device), and/or a third server device that provides a replication service for the second server device (e.g., an enqueue replication service (ERS) that stores an application lock in a shared memory, which in the event of a failover of the second server device, may be used to generate a lock list to recreate user transactions).

As further shown, a set of server devices associated with the DB cluster shown by reference number 114-1 may be associated with a set of virtual Internet protocol (VIP) addresses. In some implementations, the set of server devices associated with the DB cluster shown by reference number 114-1 may implement a file system. For example, as shown in FIG. 1, the set of server devices associated with the DB cluster shown by reference number 114-1 may implement an automatic storage management cluster file system (ACFS) that provides a high availability network file system (HA-NFS) for SAP executables and interface file systems. This permits a data center to provide a high availability file system, thereby improving an availability of the data center relative to a data center that does not implement a file system, such as ACFS.

As further shown by reference number 114-1, and by the dotted lines, the DB cluster shown by reference number 114-1 may provide a load balancing and/or a failover service among the server devices associated with the DB cluster shown by reference number 114-1. For example, and as shown by the dotted lines, the DB service provided by the first server device associated with the DB cluster shown by reference number 114-1 may fail over to the second server device and/or the third server device associated with the DB cluster shown by reference number 114-1. As further shown, a service provided by the second server device may fail over to the first server device and/or the third server device and a service provided by the third server device may fail over to the first server device and/or the second server device in a similar manner. This increases an availability of the data center by permitting a service associated with a first server device to automatically fail over to a second server device, thereby reducing or eliminating down time of the service.

As shown by reference number 114-2, and for example, the set of DB clusters may include a RAC DB/SAP central services (SCS) (RAC DB/SCS) DB cluster. The DB cluster shown by reference number 114-2 may be similar to the DB cluster shown by reference number 114-1, except that the server device providing a message and/or enqueue service may be an SCS server device rather than an ASCS server device. In some implementations, an SCS server device may be used to load balance within a data center and/or for inter-node communication within a data center.

As shown by reference number 116, various elements of the data center may be interconnected. For example, the set of DB clusters, shown by reference numbers 114-1 and 114-2, and the set of application server devices, shown by reference numbers 104-1 through 104-3, may be interconnected through a network file system (NFS) via automatic storage management cluster file system (ACFS) and/or network-attached storage (NAS). Additionally, or alternatively, and as another example, the set of DB clusters, shown by reference numbers 114-1 and 114-2, and the set of application server devices, shown by reference numbers 104-1 through 104-3, may be interconnected using hypertext transfer protocol (HTTP), a remote function call (RFC), SAP Java connector (JCo), JDBC, simple object access protocol (SOAP), an application program interface (API), and/or the like. This permits elements of the data center to communicate, such as to exchange data, access data, provide a service, provide an application, and/or the like.

As shown by reference number 118, the data center may perform a file system replication. For example, the data center may provide files, data, information related to applications, and/or the like to another data center (not shown) to replicate the files, the data, and/or the applications, at the other data center (e.g., a secondary data center, a disaster recovery data center, etc.). When performing a file system replication, the data center may provide copies of files, data, information related to applications, and/or the like to the other data center so that the other data center can become operational quickly, while minimizing data loss when the data center experiences an outage. This permits disaster recovery of a file system via use of the other data center, while reducing or eliminating loss of data, files, applications, and/or the like due to a partial or complete outage at the data center. For example, replication of the file system of the data center on another data center may permit the other data center to operate using the same file system as the data center when the data center experiences an outage, thereby reducing or eliminating interruptions to operations due to lost portions of a file system, conserving processing resources that would otherwise be consumed recovering lost portions of a file system, and/or the like.

As shown by reference number 120, the data center may perform an action related to data replication. For example, the data center may implement active data guard, data guard, and/or the like to replicate data between two or more data centers (e.g., a primary data center shown in FIG. 1 and a secondary data center, not shown in FIG. 1, that is to be used for disaster recovery when the primary data center experiences a partial or complete outage). Continuing with the previous example, active data guard, data guard, and/or the like may permit the data center to replicate files, data, and/or the like on another data center that is to be used when the data center experiences an outage. This permits disaster recovery of data associated with a data center when the data center experiences a partial or complete outage, while reducing or eliminating loss of data. For example, replication of data associated with a data center on another data center may permit the other data center to use the same data as the data center, thereby reducing or eliminating interruptions caused by lost data, conserving processing resources that would otherwise be used to recover lost data, and/or the like.

Implementations, described herein, provide a system (e.g., a data center) that is capable of providing a fail over service for applications, devices, etc., a data replication service, and/or the like for the system. In this way, the system may provide a threshold level of availability (e.g., a high availability) and may be capable of permitting disaster recovery of the system in the event of a partial or complete outage of a system. This improves operations of the system by improving an availability of the system and/or reducing an amount of downtime for the system in the event of a partial or complete outage. In addition, this reduces an amount of time needed to recover the system via, for example, data and file system replication, thereby facilitating quick recovery of the system. Further, this reduces an amount of redundancy needed to permit recovery of a system by reducing or eliminating a need for a complete system redundancy, computing resources that mirror data in real-time, and/or the like. Further, this reduces data loss due to the system being overloaded and/or due to a partial or complete outage of the system, thereby improving performance of the system via reduced data loss and/or conserving processing resource of the system that would have to be used to recover lost data.

As indicated above, FIG. 1 is provided merely as an example. Other examples are possible and may differ from what was described with regard to FIG. 1. Although FIG. 1 was described with regard to a data center, the implementations described with regard to FIG. 1 apply equally to other types of systems.

Figure 2:
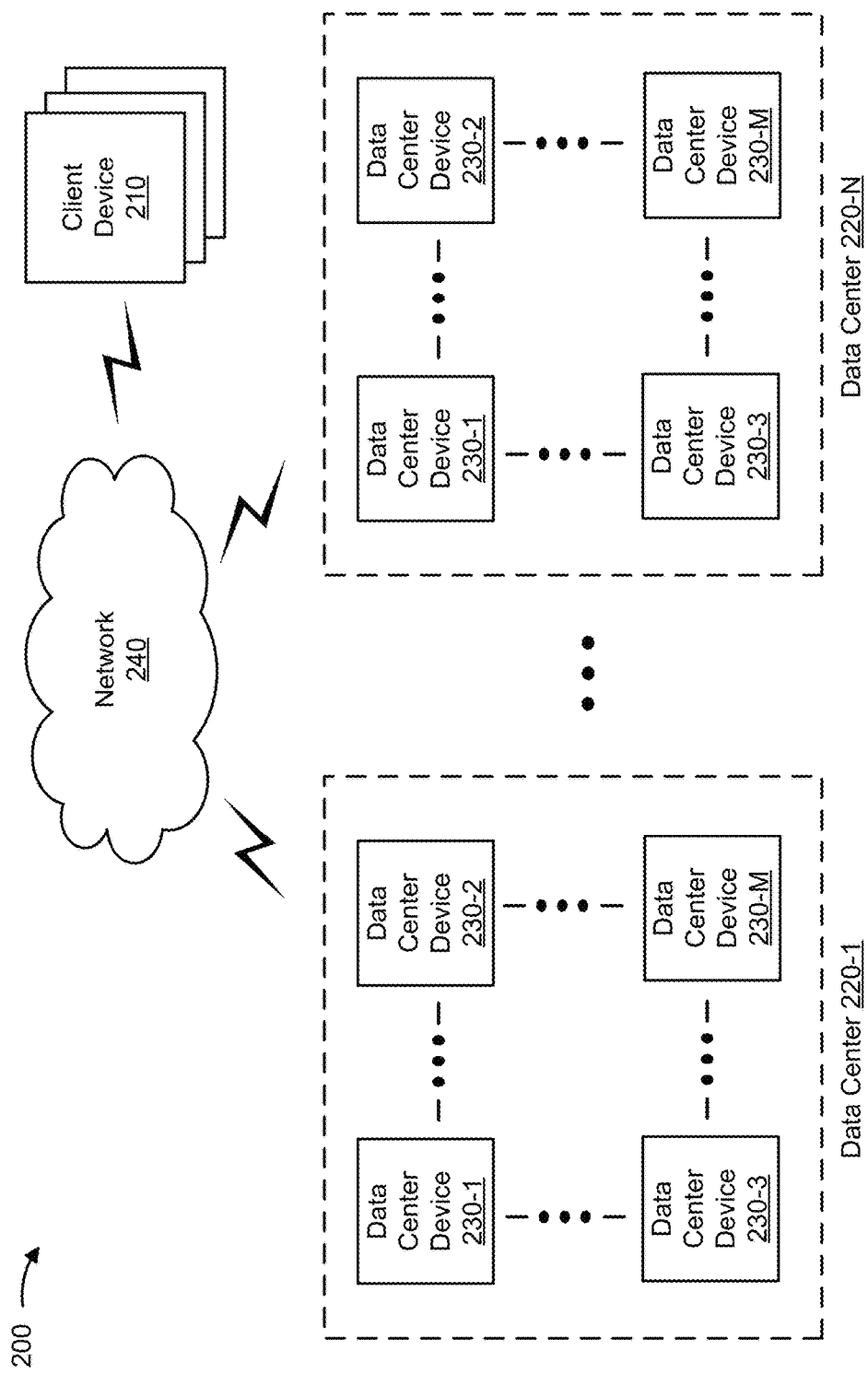
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, one or more data centers 220-1 through 220-N (N≥1) (hereinafter referred to collectively as "data centers 220," and individually as "data center 220"), one or more data center devices 230-1 through 230-M (M≥1) (hereinafter referred to collectively as "data center devices 230" and individually as "data center device 230"), and a network 240. Devices of environment 200 may interconnect via wired connections, wireless connections, or a combination of wired and wireless connections.

Client device 210 includes one or more devices capable of receiving, generating, storing, processing, and/or providing information associated with a system (e.g., a data center). For example, client device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, client device 210 may access data center 220 via an interface associated with data center 220 (e.g., using a virtual URL or a NetScaler URL that is load balanced among a set of data centers 220 and/or a set of data center devices 230 and provides seamless connectivity to an application associated with any one of the set of data centers 220 via resolution to an Internet protocol (IP) address associated with any one of the set of data centers 220), as described elsewhere herein. Additionally, or alternatively, client device 210 may initiate disaster recovery of data center 220 (e.g., when data center 220 experiences a partial or complete outage).

Data center 220 includes a logical or physical grouping of devices (e.g., a set of data center devices 230). For example, data center 220 may include a facility that houses a set of data center devices 230, a cloud-based grouping of a set of data center devices 230 (e.g., where a physically distributed set of data center devices 230 are grouped), and/or the like. In some implementations, data center 220 may provide a service (e.g., a data access service, a data modification service, an inventory management service, etc.) to client device 210, may host an application (e.g., that can be accessed by client device 210), and/or the like, as described elsewhere herein.

Data center device 230 includes one or more devices capable of receiving, generating, storing, processing, and/or providing information associated with a system (e.g., a data center). For example, data center device 230 may include a server device, such as a server (e.g., in a data center or a cloud computing environment), a data center (e.g., a multi-server micro data center), a workstation computer, or a virtual machine (VM) provided in a cloud computing environment, a network device, such as modem, a firewall, a router, a gateway, a switch, a hub, a bridge, a reverse proxy (e.g., a proxy server), a security device, an intrusion detection device, or a load balancer, a GSS device, and/or a similar type of device. In some implementations, data center device 230 may provide a service, may host an application, and/or the like associated with data center 220, as described elsewhere herein. In some implementations, data center device 230 may be a physical device implemented within a housing, such as a chassis. In some implementations, data center device 230 may be a virtual device implemented by one or more computer devices of a cloud computing environment or data center 220.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
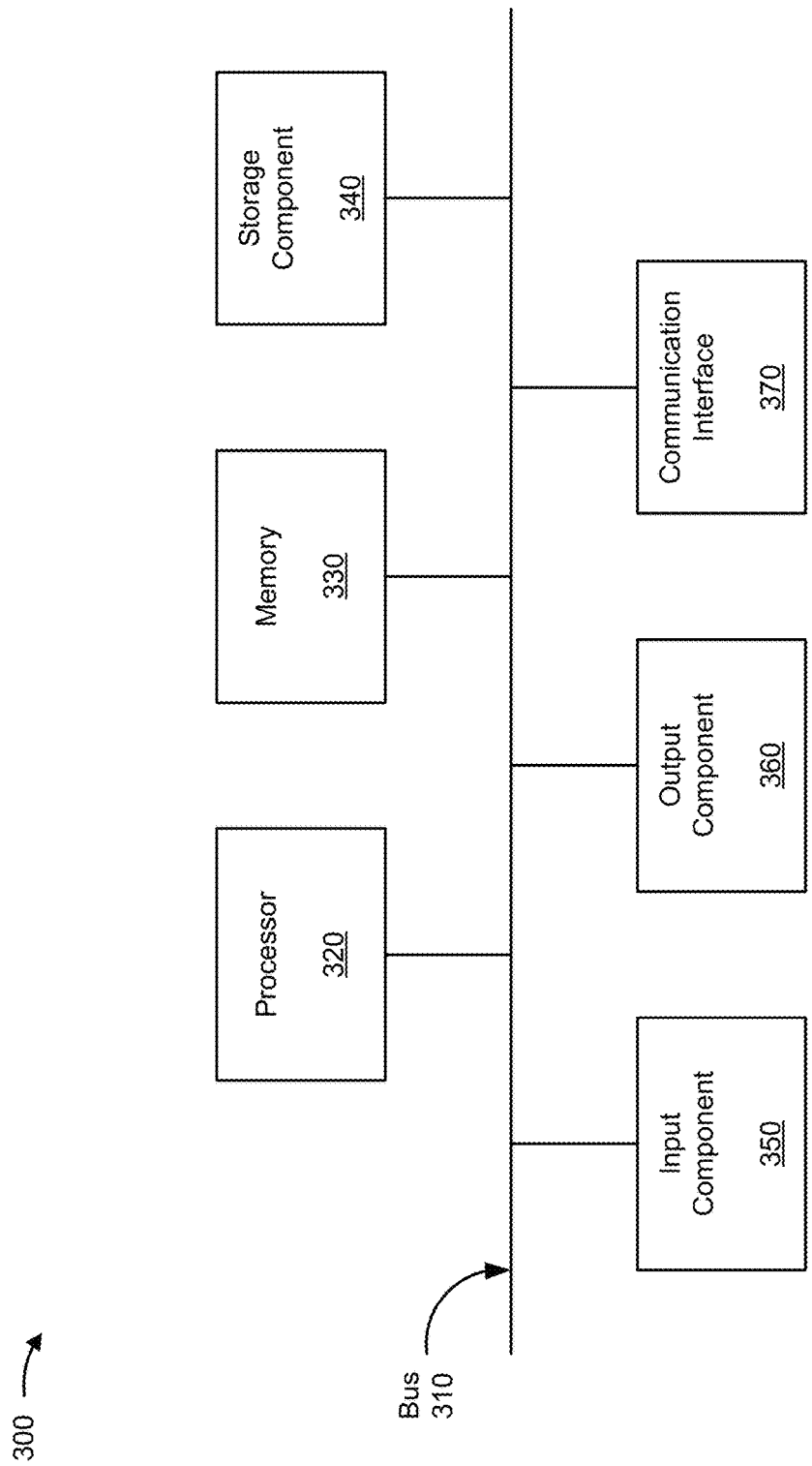
FIG. 3 is a diagram of example components of one or more devices of FIG. 2.

FIG. 3 is a diagram of example components of a device 300. Device 300 may correspond to client device 210, data center 220, and/or data center device 230. In some implementations, client device 210, data center 220, and/or data center device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
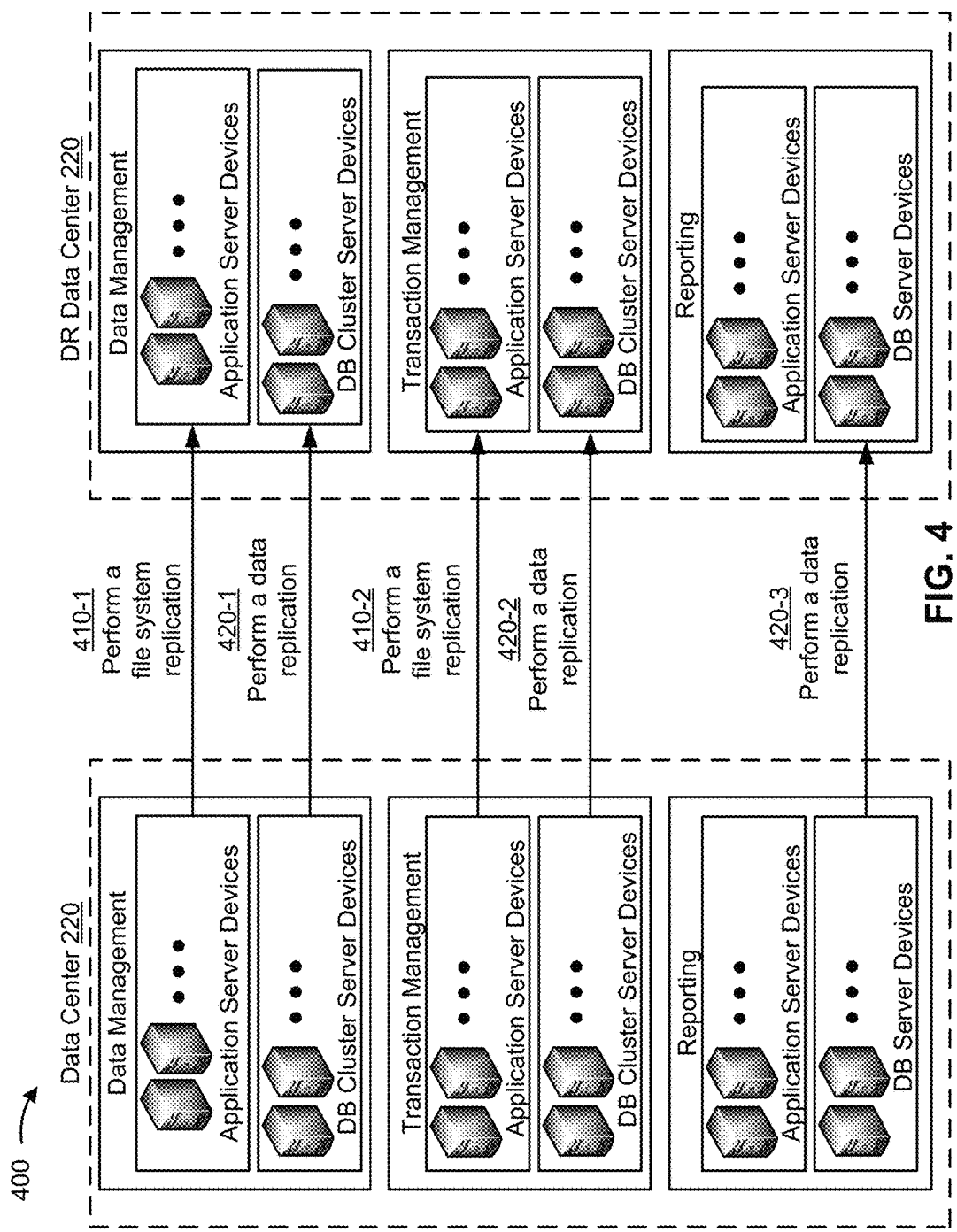
FIG. 4 is a diagram of an example implementation described herein.

FIG. 4 is a diagram of an example implementation 400 relating to example implementation 100 shown in FIG. 1. FIG. 4 shows an example implementation related to disaster recovery of data center 220. As shown in FIG. 4, implementation 400 may include data center 220 (e.g., a primary data center 220 used to provide a service and/or an application to client device 210) and a disaster recovery (DR) data center 220 that may become operational in the event that data center 220 experiences a partial or complete outage.

For example, DR data center 220 may provide disaster recovery for a data management service provided by data center 220, a transaction management service provided by data center 220, a reporting service provided by data center 220, and/or the like. In some implementations, data center 220 and DR data center 220 may include data center devices 230, shown in FIG. 4 as various types of server devices. In some implementations, data center 220 and/or DR data center 220 may perform the implementations described with respect to FIG. 4 prior to data center 220 experiencing a partial or complete outage (e.g., during normal operations of data center 220).

As shown in FIG. 4, and by reference number 410-1, data center 220 may perform a file system replication to replicate files associated with data center 220 in DR data center 220. For example, data center 220 may use remote sync (rsync) replication for SAP file systems to replicate a file system of data center 220 in DR data center 220. In some implementations, and continuing with the previous example, data center 220 may perform a replication of an interface, an executable (e.g., a file that contains a program, such as an executable file), and/or the like (e.g., using rsync replication). In some implementations, when performing a file system replication, data center 220 may provide a copy of a file, or a file system, from a set of application server devices associated with data center 220 to a set of application server devices associated with DR data center 220. In this way, data center 220 may perform a file system replication for a file system related to a service provided by data center 220, such as a data management service.

As further shown in FIG. 4, and by reference number 420-1, data center 220 may perform a data replication. For example, data center 220 may perform a data replication for data using data guard, advanced data guard, and/or the like. In some implementations, when performing a data replication, data center 220 may provide a copy of data from a set of server devices associated with a DB cluster (e.g., a RAC DB cluster) associated with data center 220 to a set of server devices associated with a DB cluster associated with DR data center 220. In this way, data center 220 may perform a data replication for data related to a service provided by data center 220, such as a data management service.

As further shown in FIG. 4, and by reference number 410-2, data center 220 may perform a file system replication. In some implementations, data center 220 may perform a file system replication in a manner similar to that described above with respect to reference number 410-1. In this way, data center 220 may perform a file system replication for a file system related to a service provided by data center 220, such as a transaction management service.

As further shown in FIG. 4, and by reference number 420-2, data center 220 may perform a data replication in a manner similar to that described above with respect to reference number 420-1. In this way, data center 220 may perform a data replication for data related to a service provided by data center 220, such as a transaction management service.

As further shown in FIG. 4, and by reference number 420-3, data center 220 may perform a data replication. For example, data center 220 may perform a data replication using Hana asynchronous storage replication to replicate data from a set of server devices (e.g., Hana DB server devices), included in data center 220 and associated with reporting on a set of server devices (e.g., Hana DB server devices) included in DR data center 220 and associated with reporting. In this way, data center 220 may perform a data replication for data related to a service provided by data center 220, such as a reporting service.

As indicated above, FIG. 4 is provided merely as an example. Other examples are possible and may differ from what was described with regard to FIG. 4. Although FIG. 4 was described with respect to server devices, the implementations relating to FIG. 4 may apply equally to another type of data center device 230, such as a network device, client device 210, etc.

Figure 5:
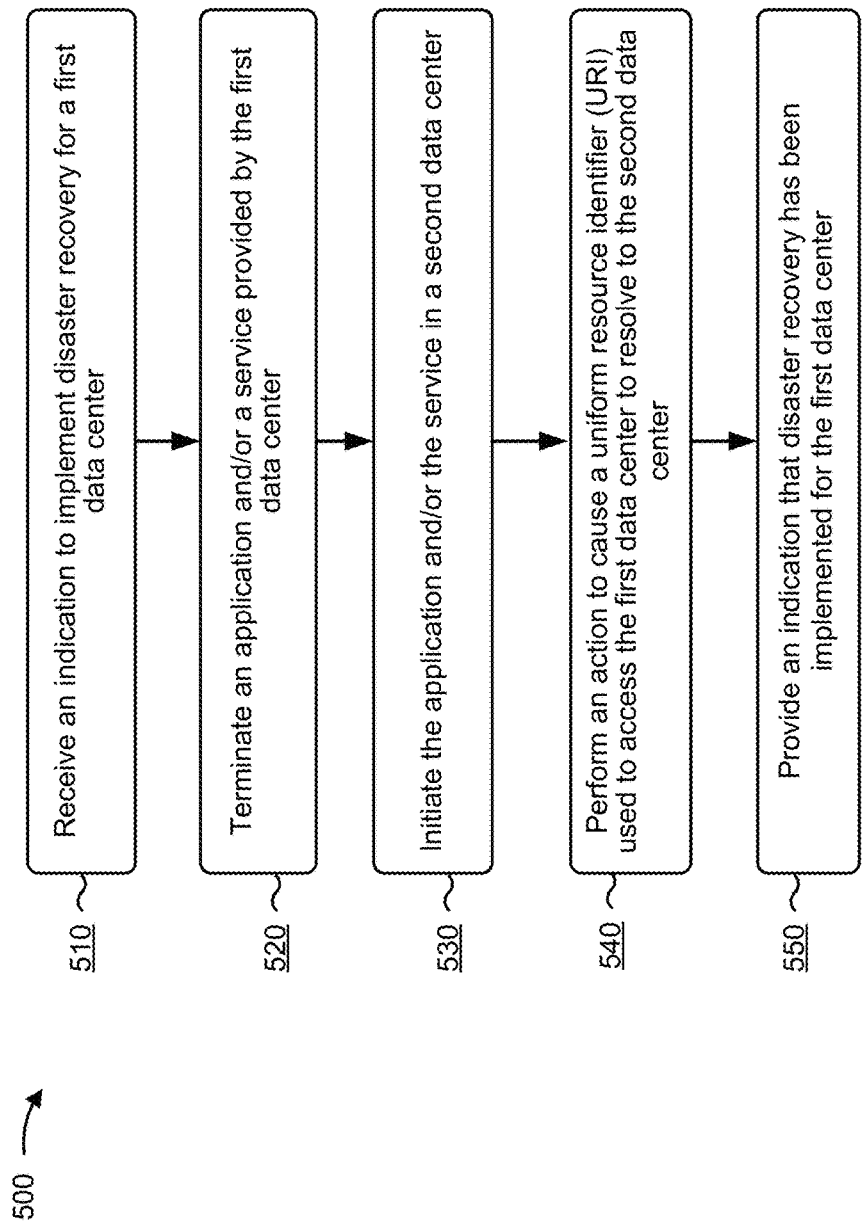
FIG. 5 is a flow chart of an example process for disaster recovery of a system.

FIG. 5 is a flow chart of an example process 500 for disaster recovery of a system. In some implementations, one or more process blocks of FIG. 5 may be performed by client device 210. In some implementations, one or more process blocks of FIG. 5 may be performed by another device or a group of devices separate from or including client device 210, such as data center 220 and/or data center device 230.

As shown in FIG. 5, process 500 may include receiving an indication to implement disaster recovery for a first data center (block 510). For example, client device 210 may receive an indication to implement disaster recovery for a first data center 220 (e.g., data center 220 being used to provide an application and/or a service to another client device 210). In some implementations, client device 210 may receive the indication when the first data center 220 experiences a partial or complete outage, when the first data center 220 is scheduled to be down (e.g., for maintenance), when the first data center 220 is overloaded with traffic, and/or the like. In some implementations, disaster recovery may include a set of processes that enable recovery and/or continuation of data, an application, a service, etc. that the first data center 220 is providing or is configured to provide.

As further shown in FIG. 5, process 500 may include terminating an application and/or a service provided by the first data center (block 520). For example, client device 210 may terminate an application and/or a service provided by the first data center 220. In some implementations, client device 210 may terminate an application and/or a service upon receiving an indication to implement disaster recovery, by scheduling an application and/or a service for termination, by sending a set of instructions to the first data center 220 and/or an associated data center device 230 providing the application and/or service (e.g., to terminate the application and/or service, to power down the first data center 220 and/or data center device 230, etc.), and/or the like.

In some implementations, an application may include software designed to perform a set of functions, tasks, or activities. In some implementations, an application may be associated with the first data center 220 and/or data center device 230. For example, an application may be installed on the first data center 220 and/or data center device 230, may execute on the first data center 220 and/or data center device 230, may be executed remotely by the first data center 220 and/or data center device 230, may be hosted by the first data center 220 and/or data center device 230, and/or the like.

In some implementations, an application may be virtualized. For example, an application may be associated with multiple data centers 220, multiple data center devices 230, and/or the like. Additionally, or alternatively, an application may be virtualized from the perspective of client device 210 using the application. For example, the application may be virtualized such that a uniform resource identifier (URI) used to access the application can resolve to any one of a set of data centers 220, a set of data center devices 230, and/or the like (e.g., during an outage of data center 220 and/or data center device 230). This permits quick and efficient recovery of the application by permitting a URI to be quickly reconfigured to resolve to a different data center 220 and/or data center device 230, while minimizing interruption of access to the application. In addition, this improves a user experience related to recovering an application via seamless transition from one data center 220 and/or data center device 230 to another data center 220 and/or data center device 230.

For example, when a first data center 220 and/or data center device 230 experiences an outage, a second data center 220 and/or data center device 230 may become operational quickly to perform the operations of the first data center 220 and/or data center device 230, with minimal data loss, minimal interruption to operations of the first data center 220 and/or data center device 230, and/or the like. In addition, and continuing with the previous example, a user of client device 210 may access the second data center 220 and/or data center device 230 in a manner similar to that for accessing the first data center 220 and/or data center device 230 (e.g., using the same URI to access the second data center 220 and/or data center device 230 as was used to access the first data center 220 and/or data center device 230).

In some implementations, a service may include a service provided by the first data center 220 and/or an associated data center device 230. For example, a service may include a data access service, a data storage service, a data modification service, an inventory management service, and/or the like. In some implementations, an application may be used to provide a service and the service may be virtualized in a manner similar to that described above with respect to an application.

As further shown in FIG. 5, process 500 may include initiating the application and/or the service in a second data center (block 530). For example, client device 210 may initiate the application and/or the service in a second data center 220 (e.g., a disaster recovery data center 220 that is geographically separated from the first data center 220).

In some implementations, client device 210 may initiate the application and/or the service by sending a set of instructions to a second data center 220 and/or data center device 230 associated with the second data center 220, powering on a second data center 220 and/or data center device 230 associated with the second data center 220, and/or the like. In some implementations, the application and/or service that client device 210 initiates on the second data center 220 may be the same as the application and/or service that client device 210 terminated on the first data center 220. In some implementations, the application and/or service that client device 210 initiates on the second data center 220 may use data, a file system, and/or the like that was replicated from the first data center 220 to the second data center 220, as described above with respect to FIG. 4. This permits a seamless transition from the first data center 220 to the second data center 220, while minimizing data loss, interruption of service, and/or the like.

As further shown in FIG. 5, process 500 may include performing an action to cause a uniform resource identifier (URI) used to access the first data center to resolve to the second data center (block 540). For example, client device 210 may perform an action to cause a URI used to access the first data center 220 to resolve to the second data center 220. In some implementations, a URI (e.g., a domain name, a URL, a URN, an IP address, etc.) may include information used to access a resource, such as data center 220, data center device 230, an application, a service, and/or the like.

In some implementations, when performing the action, client device 210 may update information used to route traffic to data center 220 and/or a particular data center device 230 associated with data center 220. For example, client device 210 may update a data structure that includes information identifying various data centers 220 and/or associated data center devices 230 and corresponding URIs used to access the various data centers 220 and/or associated data center devices 230. Continuing with the previous example, client device 210 may update a data structure that initially routes traffic associated with a URI to the first data center 220 and/or an associated data center device 230 such the URI resolves to the second data center 220 and/or an associated data center device 230 (e.g., traffic is routed to the second data center 220 rather than the first data center 220). This permits the same URI to be used to access different data centers 220. In some implementations, use of the same URI improves access to data center 220 and/or data center device 230 by reducing or eliminating a need for a user of client device 210 to input a different URI to access data center 220 and/or data center device 230 when another data center 220 and/or data center device 230 experiences an outage.

As further shown in FIG. 5, process 500 may include providing an indication that disaster recovery has been implemented for the first data center (block 550). For example, client device 210 may provide an indication that disaster recovery has been implemented for the first data center 220 (e.g., that the same application and/or service has been initiated on the second data center 220). In some implementations, client device 210 may provide an indication to another client device 210 (e.g., a client device 210 using the application and/or service), for display, and/or the like.

In some implementations, client device 210 may generate a report related to implementing disaster recovery (e.g., a time of the outage of the first data center 220, an amount of time between the outage and when the second data center 220 became operational, a quantity of client devices 210 affected by the outage, etc.). In some implementations, client device 210 may provide the report to another client device 210 (e.g., associated with a network administrator).

Additionally, or alternatively, and as another example, client device 210 may store information related to implementing disaster recovery and/or the outage of the first data center 220. For example, client device 210 may store information identifying a source of the outage, whether the outage was a complete or a partial outage, and/or the like. This may facilitate fixing of the outage at the first data center 220. Additionally, or alternatively, and as another example, client device 210 may perform set of actions, similar to that described herein with respect FIG. 5 to cause the application and/or the service to be provided by the first data center 220 after the outage has been fixed.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Some implementations, described herein, provide a system (e.g., a data center) that is capable of providing a fail over service for applications, devices, etc., a data replication service, and/or the like for the system. In this way, the system may provide a threshold level of availability (e.g., a high availability) and may be capable of permitting disaster recovery of the system in the event of a partial or complete outage of a system. This improves operations of the system by improving an availability of the system and/or reducing an amount of downtime for the system in the event of a partial or complete outage. Further, this reduces data loss due to the system being overloaded and/or due to a partial or complete outage of the system, thereby improving performance of the system via reduced data loss and/or conserving processing resource of the system that would have to be used to recover lost data.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
a set of interfaces to provide a first device with connectivity to a first data center;
a second device to provide a uniform resource identifier (URI) resolution or routing service among the first data center and a second data center,
the first data center and the second data center being physically separated,
the URI configured to access the first data center when the first data center is not experiencing an outage and configured to access the second data center when the first data center experiences the outage,
the second device providing a first failover service among devices associated with the first data center for the set of interfaces;
a first set of devices to provide a first resource to provide a first application or a first environment to run the first application;
a second set of devices to provide a second resource to provide a second application or a second environment to run the second application,
the second set of devices including a set of process orchestration (PO) application devices;
the second device providing a second failover service for the first set of devices and the second set of devices; and
a first database cluster to provide first software or a first service related to clustering a third set of devices or providing a threshold level of availability for the third set of devices,
the first database cluster providing a third failover service for the third set of devices.

2. The system of claim 1, further comprising:
a second database cluster to provide second software or a second service related to clustering a fourth set of devices or providing the threshold level of availability for the fourth set of devices,
the second database cluster providing a fourth failover service for the fourth set of devices.

3. The system of claim 1, where a third device, of the first set of devices or the second set of devices, is to fail over to a fourth device, of the first set of devices or the second set of devices.

4. The system of claim 1, where the first data center performs a file system replication related to a file system associated with the first data center by providing information to the second data center,
the file system replication being related to permitting recovery of the first data center.

5. The system of claim 1, where the first data center performs a data replication related to data associated with the first data center by providing information to the second data center,
the data replication being related to permitting recovery of the first data center.

6. The system of claim 1, where the second set of devices includes a set of devices to perform an action related to integrating the first data center and the second data center.

7. The system of claim 1, where the first set of devices and the second set of devices are interconnected using:
a remote function call (RFC),
simple object access protocol (SOAP), or
Intermediate Document (Idec).

8. A first data center, comprising:
a set of interfaces to provide a first device with connectivity to the first data center;
a second device to provide a uniform resource identifier (URI) resolution or routing service among the first data center and a second data center,
the first data center and the second data center being physically separated,
the URI configured to access the first data center when the first data center is not experiencing an outage and configured to access the second data center when the first data center experiences the outage,
the second device providing a first failover service among devices associated with the first data center for the set of interfaces;
a first set of devices to provide a first resource to provide a first application or a first environment to run the-first application;
a second set of devices to provide a second resource to provide a second application or a second environment to run the second application,
the second device providing a second failover service for the first set of devices and the second set of devices,
the second set of devices including a set of process orchestration (PO) application devices; and
a first database cluster to provide first software or a first service related to clustering a third set of devices or providing a threshold level of availability for the third set of devices,
the first database cluster providing a third failover service for the third set of devices.

9. The first data center of claim 8, further comprising:
a second database cluster to provide second software or a second service related to clustering a fourth set of devices or providing the threshold level of availability for the fourth set of devices,
the second database cluster providing a fourth failover service for the fourth set of devices.

10. The first data center of claim 8, where the first database cluster includes:
a third device that provides a database service that is to fail over to a fourth device that provides a message or enqueue service or a fifth device that provides an enqueue replication service (ERS),
the fourth device that is to fail over to the third device or the fifth device, or
the fifth device that is to fail over to the third device or the fourth device.

11. The first data center of claim 8, where the first data center is to perform a data replication using:
data guard, or
active data guard.

12. The first data center of claim 8, where the first set of devices, the second set of devices, the first database cluster, and a second database cluster are connected using:
a network file system (NFS) via automatic storage management cluster file system (ACFS) or network-attached storage (NAS),
hypertext transfer protocol (HTTP),
a remote function call (RFC),
a Java connector (Jace),
Java database connectivity (JDBC),
simple object access protocol (SOAP), or
an application program interface (API).

13. The first data center of claim 8, where the first set of devices includes a set of enterprise resource planning (ERP) central component (ECC) application server devices.

14. The first data center of claim 8, where the first set of devices and the second set of devices are interconnected using:
a remote function call (RFC),
simple object access protocol (SOAP), or
Intermediate Document (iodic).

15. A network-based system, comprising:
a first device to provide a uniform resource identifier (URI) resolution or routing service among a first data center and a second data center,
the first data center and the second data center being physically separated,
the URI configured to access the first data center when the first data center is not experiencing an outage and configured to access the second data center when the first data center experiences the outage,
the first device providing a first failover service among devices associated with the first data center for a set of interfaces;
a first set of devices being associated with a first application;
a second set of devices being associated with a second application,
the second set of devices including a set of process orchestration (PO) application devices,
the first device providing a second failover service for the first set of devices and the second set of devices; and
a first database cluster to provide first software or a first service related to clustering a third set of devices or providing a threshold level of availability for the third set of devices,
the first database cluster providing a third failover service for the third set of devices.

16. The network-based system of claim 15, further comprising:
- a second database cluster to provide second software or a second service related to clustering a fourth set of devices or providing the threshold level of availability for the fourth set of devices,
- the second database cluster providing a fourth failover service for the fourth set of devices.

17. The network-based system of claim 16, where the first database cluster or the second database cluster include:
- a second device that provides a database service,
- a third device that provides a message or an enqueue service, or
- a fourth device that provides an enqueue replication service (ERS).

18. The network-based system of claim 15, where the first data center is to provide a copy of a file, or a file system, to a second database cluster associated with the second data center.

19. The network-based system of claim 15, further comprising:
- a fourth set of devices including:
- a second device that hosts a solution manager application,
- a third device that is functioning as a non-production device to be used to test the first data center, or
- a fourth device that hosts a business warehouse (BW) application.

20. The network-based system of claim 15, where the first database cluster and a second database cluster, associated with the first data center, implement an automatic storage management cluster file system (ACFS).

\* \* \* \* \*